United States Patent [19]
Kimmich et al.

[11] Patent Number: 6,087,656
[45] Date of Patent: Jul. 11, 2000

[54] RADIATION DETECTOR SYSTEM AND METHOD WITH STABILIZED SYSTEM GAIN

[75] Inventors: Kevin Kimmich, Chardon; Carlos Grodsinsky, Strongsville; Muhammad Ejaz, Twinsburg, all of Ohio

[73] Assignee: Saint-Gobain Industrial Cermaics, Inc., Worcester, Mass.

[21] Appl. No.: 09/097,836

[22] Filed: Jun. 16, 1998

[51] Int. Cl.[7] .............................. G01D 18/00; G01V 5/04; G01T 1/208

[52] U.S. Cl. ................. 250/252.1; 250/305; 250/363.01; 250/261

[58] Field of Search .................................. 250/252.1, 253, 250/361 R, 362, 363.01, 365, 261

[56] References Cited

U.S. PATENT DOCUMENTS

| | | | |
|---|---|---|---|
| 3,922,541 | 11/1975 | Seeman | 250/256 |
| 4,053,767 | 10/1977 | Kampfer et al. | |
| 4,220,851 | 9/1980 | Whatley, Jr. | |
| 4,272,677 | 6/1981 | Berthold et al. | 250/252.1 |
| 4,300,043 | 11/1981 | Robbins | |
| 4,346,590 | 8/1982 | Brown | |
| 5,160,844 | 11/1992 | Albats | |
| 5,376,797 | 12/1994 | Persyk et al. | 250/363.09 |

FOREIGN PATENT DOCUMENTS 2 068 533  8/1981  United Kingdom.

OTHER PUBLICATIONS

V.I. Kryshkin et al, "Light yield dependence of a plastic scintillator excited with UV laser and radioactive source on radiation dose", Nuclear Instruments and Method in Physics Research A 381 (1996) 573–575.

David C. Stromswold et al, "Gamma–ray spectrum stabilization in a borehole probe using a light emitting diode", IEEE Transactions on Nuclear Science, vol. NS–26, No. 1, Feb. 1979.

S. C. Sabharwal et al, "Effect of impurities on scintillation—optical and thermoluminescent properties of NaI(TI)", Nuclear Instruments and Methods in Physics Research A255 (1987) 501–506.

*Primary Examiner*—Constantine Hannaher
*Assistant Examiner*—Albert Gagliaroi
*Attorney, Agent, or Firm*—D. W. Bulson; V. R. Ulbrich

[57] ABSTRACT

A closed-loop stabilization system and method for a radiation detector system including a scintillator and a light sensing device for detecting the scintillation light produced in the scintillator through interaction with impinging radiation. A spectrally stable gamma ray measurement for downhole and other non-isothermal gamma ray measurement applications is obtained by use of a light source for emitting photons, preferably ultra-violet photons, into the scintillator that are not detectable by the light sensing device. The light source causes the scintillator to fluoresce at a wavelength detectable by the light sensing device, and the change in measured fluorescence is used to adjust system gain to account for variations in scintillator output attributable to environmental conditions. In this manner, the stabilization system adjusts the system gain to maintain consistency among radiation measurements over a wide temperature range.

25 Claims, 1 Drawing Sheet

RADIATION DETECTOR SYSTEM AND METHOD WITH STABILIZED SYSTEM GAIN

FIELD OF THE INVENTION

The invention herein described relates generally to radiation detector systems and particularly those used for well logging applications. More specifically, the invention relates to circuits and methods for adjusting system gain to maintain consistency among radiation measurements over a wide temperature range.

BACKGROUND OF THE INVENTION

Spectral gamma ray measurements play a major role in oil & gas logging operations by providing a means for interpreting the porosity-lithology and naturally occurring radioactive material in the downhole environment. This is important to the oil and gas exploration industry because the porosity-lithology of rock formations can be directly correlated to the oil and gas production performance of the certain strata within a field, while the amount of naturally occurring radioactive material is correlatable to specific downhole environmental conditions which are indicative of oil & gas producing formations. Well logging tools use a radioactive source in order to irradiate the surrounding formations and detect returned Compton scattered gamma rays induced from the formation. The gamma rays are sensed downhole by a detector and the number of gamma rays arriving at the detector is inversely proportional to the electron density of the rock, which in turn is proportional to the actual rock density while the energy of the returning gamma rays is a function of the photoelectric capture cross section of the rock, which is indicative of lithology.

Downhole operations are not isothermal, and during logging operations measurement tools experience and must operate over a wide temperature range, typically from surface temperatures to 200 C. In addition, any spectral gamma ray measurement device must operate in a changing thermal environment. The spectral output efficiency of scintillation detectors that have been used in well logging applications to make the spectral gamma ray measurements, however, are dependent on temperature.

Scintillation detectors use any one of a number of phosphorescent materials (usually thallium doped sodium iodide crystal) as a radiation transducer. A gamma ray photon that interacts with the crystal will cause it to emit a number of visible light photons in proportion to the energy of the incident gamma ray. A photomultiplier tube (PMT) converts the visible light into an electrical pulse that is proportional in magnitude to the number of visible light photons that reach its photocathode. The pulse is processed by electronics that accumulate energy and count rate data about the radiation.

The pulse height vs. gamma ray energy measured by a scintillation detector drops as temperature increases because both the light output of the scintillation detector and the gain of the photomultiplier tube (PMT) decrease. The light output of the scintillation detector drops because the crystal material itself becomes less efficient at producing visible light per gamma ray photon, and the optical properties of the detector degrade with temperature. Also, the sodium iodide crystal typically is packaged within a hermetically sealed can, surrounded by reflector material, and optically interfaced to a transparent window. At higher temperatures, the reflector materials may become less efficient, as well as the crystal body, and the interfaces may absorb more visible light photons.

Consequently, such detectors require the use of some gain or energy stabilization approach to adjust system gain to maintain consistency among all radiation measurements over a wide temperature range. Such gain adjustment may be effected by increasing the PMT voltage or amplifier gain.

Current state-of-the-art approaches to gain adjustment generally fall into two energy stabilization control categories: open-loop and closed-loop. Open-loop stabilization systems measure the ambient operating temperature of the crystal and PMT and change the system gain according to a previously measured pulse height vs. temperature system categorization function where certain gain or high voltage power supply settings have been stored in a look-up table. A closed-loop system monitors the pulse height of some isotopic reference, usually an Am-241 NaI(TI) pulser, or some other radiation source, and adjusts the system gain or supply voltage to maintain the peak centroid channel of the reference regardless of temperature.

Open-loop stabilization systems assume that scintillation package light output is a function of temperature only; however, this is not the case due to degradation of the detector over time. Therefore, the compensation system will begin to malfunction after repeated exposure to high temperatures, unless the system is calibrated frequently providing new system gain or high voltage power supply settings. In addition, any degradation of the detector during operation of an open-loop compensation technique will result in inaccurate energy spectral data.

Closed-loop stabilization systems typically use an Am-241 NaI(TI) pulser, or some other radioactive source that is housed within the hermetic package, as a reference. The americium source emits an alpha particle which strikes the NaI(TI) crystal in the pulser package and causes it to emit a greater number of photons than do the gamma rays over the energy range of interest. The system changes gain so the pulser peak remains at a constant centroid location. This system assumes that the pulser light output has a functional relationship with the crystal's light output that is constant in time. This may or may not be true. Also, the assessment of the reference peak centroid location becomes accurate only after several thousand counts accumulate in the peak centroid. However, the calibration sources used generally have a low count rate, so a spectrum must be accumulated for an extended period of time before a correction to the high voltage is made. If the temperature changes within the sampling time, then the gain correction will be inaccurate because the reference peak location will be smeared. In addition, since this gain stabilization approach is predicated on the accuracy and resolution of the isotopic source, the system's measurement dynamic range, accuracy and resolution is dictated by the control signal. The statistical nature of the reference source used in closed-loop systems makes the accuracy of the error signal, and therefore, the correction a function of sampling time. The radioactive source may also introduce unwanted counts in the spectral bandwidth.

Non-radioactive pulsers have also been suggested, such as a pulser driven light emitting diode. In U.S. Pat. No. 4,220,851, a light emitting diode (LED) is driven by an oscillator circuit to emit optical stabilization pulses. The LED is mounted between the scintillation crystal and the photomultiplier tube in an optically transparent disk, so that light flashes of the light emitting diode are also sensed by the photomultiplier tube. As stated in this patent, stabilization and synchronization pulses are generated in the optical portion of the detector and compensation for, and stabilization of variations in gain, both optical and electronic, may be made.

SUMMARY OF THE INVENTION

The present invention provides a closed-loop stabilization system for radiation detector systems and the like including a scintillator and a light sensing device for detecting the scintillation light produced in the scintillator through interaction with impinging radiation. According to a preferred embodiment of the system, a spectrally stable gamma ray measurement for downhole and other non-isothermal gamma ray measurement applications is obtained by use of a light source for emitting photon pulses, preferably ultra-violet photon pulses, into the scintillator that are not detectable by the light sensing device. The light source preferably is thermally insensitive for emitting a constant number of ultra-violet photons per pulse that cause the scintillator to fluoresce at a wavelength detectable by the light sensing device. The number of photons the crystal fluoresces decreases as the temperature increases. As is preferred, a controller is gated to measure every pulse the light source causes, and then the gain is adjusted using a proportional-integral-derivative (PID) control algorithm so the system maintains a substantially constant pulse height vs. energy curve at all times. The stabilization system adjusts the system gain to maintain consistency among radiation measurements over a wide temperature range.

Accordingly, the invention provides a radiation detection system comprising a scintillator for emitting flashes of light in response to radiation impinging upon the scintillator; a light sensing device positioned proximate to the scintillator for receiving the flashes of light, the light sensing device producing an electrical output having a magnitude correlated to the light produced by the crystal; a light source for emitting photons into the scintillator that are not detectable by the light sensing device but which cause the scintillator to fluoresce at a wavelength detectable by the light sensing device; and a gain stabilization circuit that monitors the scintillator output attributable to the photon emitting light source and adjusts the gain of the system in response to changes in the scintillator output attributable to the photon emitting light source.

The invention also provides a method of stabilizing the output of a radiation detection system which includes a scintillator for emitting flashes of light in response to radiation impinging upon the scintillator and a light sensing device positioned proximate to the scintillator for receiving the flashes of light, the light sensing device producing an electrical output having a magnitude correlated to the light produced by the crystal. The method comprises (i) emitting photons into the scintillator that are not detectable by the light sensing device but which cause the scintillator to fluoresce at a wavelength detectable by the light sensing device; (ii) monitoring the scintillator output attributable to the photon emitting light source; and (iii) adjusting the gain of the system in response to changes in the scintillator output attributable to the photon emitting light source.

According to a preferred embodiment of the invention, the scintillator comprises a scintillation crystal, such as sodium iodide (NaI(Tl)) crystal. For a NaI(Tl) crystal, an ultra-violet light pulser preferably is chosen as the photon emitting light source in order to maximize the absorbed spectrum of the scintillation crystal. A preferred pulser wavelength for NaI(Tl) is about 300 nm. However, the invention encompasses the use of other scintillators and, for a given scintillator, the desired input fluorescence spectrum is chosen to ensure the input fluorescence spectrum is absorbed, preferably fully, by the scintillator and that a minimum or no transmitted input fluorescence spectrum is experienced by the light sensing device.

The herein disclosed preferred stabilization technique will be superior to current practices because the UV reference source will be a line in the energy spectrum, is non-radioactive, and will introduce no unwanted counts in the energy spectrum. In addition, such a closed-loop stabilization approach provides the opportunity to self-calibrate and ensure gain stabilization after some system detector degradation due to its operational environment.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

BRIEF DESCRIPTION OF THE DRAWINGS

The sole drawing FIGURE is a diagrammatic illustration of a radiation detector system according to the invention.

DETAILED DESCRIPTION OF THE INVENTION

Figure 1:
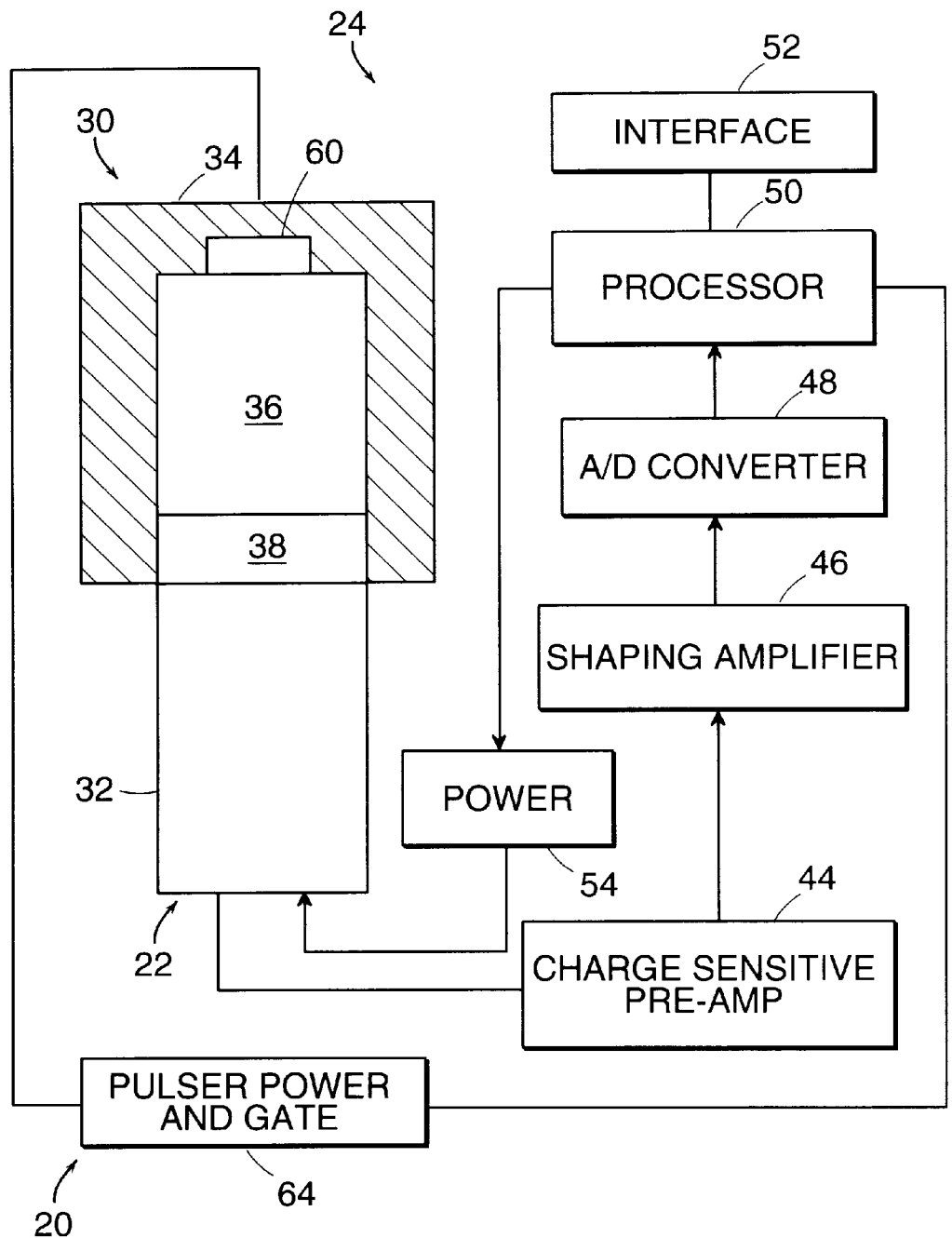

Referring now in detail to the drawing, an exemplary embodiment of a radiation detector system according to the invention is designated generally by reference numeral 20. The system 20 generally comprises a radiation detector assembly 22 and electrical circuitry generally indicated at 24. The electrical circuitry 24 may be packaged with the radiation detector assembly 22 as is preferred, although portions thereof may be located remotely and connected to the detector assembly by suitable leads.

The radiation detector assembly 22 comprises a scintillator 30 and a light sensing device 32 for sensing light flashes emitted by the scintillator, i.e., scintillation light from interactions with radiation impinging on the scintillator. The illustrated scintillator 30 is in the form of a scintillation crystal package including a container 34 enclosing a scintillation crystal 36. The crystal 36 may be, for example, a thallium-activated sodium iodide crystal (NaI(Tl)). The container 34 has an open front end that is closed by an optical window 38 and preferably is hermetically sealed to prevent moisture contamination of the crystal, especially if a NaI(Tl) crystal or other hygroscopic material is used. The optical window 38 should be made of a material transmissive to the scintillation light frequencies given off by the scintillation crystal.

Except as otherwise described below, the crystal package 30 may be of a conventional construction. A spring or compression pad (not shown) may be provided to axially load and bias the crystal 36 toward the optical window 38 to maintain an optical coupling with the inner face of the optical window via a layer of suitable optical coupling material (not shown) positioned between the front end face of the crystal and the optical window. In addition, the crystal preferably is surrounded by a layer of reflecting material (not shown) which in turn may be surrounded by a shock absorbing boot (not shown). For details of a suitable crystal package, reference may be had to U.S. Pat. No. 4994673.

The light sensing device 32 preferably is in the form of a photomultiplier, in particular, a photomultiplier tube (PMT). The photomultiplier tube is coupled to the scintillation crystal package 30 for measuring light passing out of the crystal package through the optical window 38. The output of the photomultiplier tube is connected to the electrical circuitry 24 which may include, as shown, a charge sensitive pre-amplifier 44, a shaping amplifier 46, an analog-to-digital converter 48, and processing circuitry 50.

During a well logging operation, the light passing out of the crystal package 30 through the optical window 38 would be composed of radiation induced scintillation light arising from interactions between gamma rays and the scintillation crystal. The photomultiplier tube 32 converts the collected light photons into electrical pulses that are shaped in the shaping amplifier 46 and digitized by the analog-to-digital converter 48. Pulses that exceed a threshold level are registered by a processor (controller) 50 as counts that may be transmitted up hole via an interface 52 to analyzing equipment. The counts are representative of detected scintillation events.

As above mentioned, downhole operations are not isothermal, and during logging operations measurement tools experience and must operate over a wide temperature range, typically from surface temperatures to 200 C. More generally, any spectral gamma ray measurement device may need to operate in a changing thermal environment. Heretofore, the pulse height vs. gamma ray energy measured by a scintillation detector drops as temperature increases because both the light output of the scintillation crystal and the gain of the photomultiplier tube (PMT) decrease. The light output of the scintillation detector 22 drops because the crystal material itself becomes less efficient at producing visible light per gamma ray photon, and the optical properties of the detector degrade with temperature. Also, the sodium iodide crystal 36 is packaged within a hermetically sealed can 34, surrounded by reflector material, and optically interfaced to a transparent window. At higher temperatures, the reflector materials may become less efficient, as well as the crystal body, and the interfaces may absorb more visible light photons.

The present invention provides a spectrally stable gamma ray measurement for downhole and other non-isothermal gamma ray measurement applications. This is accomplished in the illustrated embodiment by use of a light source 60 for emitting photon pulses into the scintillator that are not detectable by the photomultiplier tube 32 or other light sensing device that may be used. The light source, or photon pulser, preferably is thermally insensitive for emitting a constant number of photons per pulse that cause the scintillator to fluoresce at a wavelength detectable by the photomultiplier tube 32. As the temperature increases, the number of photons the crystal fluoresces decreases. The processor 50 preferably is gated so it measures every pulse the light source causes, then adjusts the gain using any suitable control technique, for example, a proportional-integral- derivative (PID) control algorithm, so the system maintains a constant pulse height vs. energy curve at all times. The stabilization system adjusts the gain of the system as by adjusting the gain of the photomultiplier tube 32, the amplifiers 44 and 46, and/or other means to maintain consistency among radiation measurements over a wide temperature range. In the illustrated embodiment, the processor adjusts the gain by controlling the power supplied to the photomultiplier tube 32 by driver circuitry 54.

As above indicated, the light source 60 is used to emit photon pulses into the scintillator that are not detectable by the photomultiplier or other light sensing device 32. The particular wavelength or wavelengths that are used will depend on the scintillator and light sensing device. For the NaI(TI) crystal 36, ultraviolet photons preferably are used. The selection of a suitable wavelength may be obtained by measuring the light output from the crystal (or other scintillator) as a function of input wavelength. At about 310 nm, a NaI(TI) crystal begins to transmit the input light. Below 310 nm, the NaI(TI) crystal absorbs light, and a preferred wavelength is about 295 nm.

The light sensing device 32 is selected and/or configured so as to detect a minimum or no photons emitted by the light source 60, while being operative to detect the light output arising from gamma ray interactions or fluorescence caused by the photon emitted by the light source. This may be accomplished in any suitable manner. For example, the selected light sensing device, for example the photomultiplier tube 32, may be insensitive to the selected wavelength or wavelengths of the UV photons emitted by the light source 60. Filters may be used as needed, and, for example, the material of the optical window 38 may be selected to filter out the light pulses emitted by the light source while allowing scintillation light to pass therethrough with no or minimal attenuation.

Any suitable light source 60 and associated driver circuitry 64 may be used for a given application. The light source, for example, may be a gas discharge lamp coupled to the scintillator 36 by suitable means, such as by use, for example, of a light pipe (for example, a fiber optic) which allows the gas discharge lamp to be located remotely from the scintillator. The driver circuitry 64 may include a flash lamp power supply interfaced to the processor which may be a micro-computer or a Digital-Signal-Processor (DSP), i.e., dedicated micro-controller. Because a gas discharge lamp emits photons over a wide range of wavelengths, a suitable filter may be used to pass only the desired wavelength or wavelengths. Other exemplary devices that may be used as the light source including laser diodes and particularly UV laser diodes, lasers and particularly UV lasers, etc.

As above indicated, the light source 60 preferably is temperature stable or stabilized so that its output is not a function of temperature. Alternatively, if the output of the light source varies with temperature or the desired operating range of the detector system, the processor 50 may operate using known empirical or calculated data about the light source to correct for output variations arising from temperature and/or other changes that may be encountered in a particular environment. Other temperature correction techniques may also be employed as may be desired.

However, preferably, the light source 60 is operated above the fluorescence saturation threshold of the scintillator 36 over the desired working temperature range of the scintillator. That is, the output of the light source is sufficiently high over the rated operational temperature range to saturate the fluorescent state of the scintillator at the selected wavelength or wavelengths, whereby any attenuation of the fluorescence output of the scintillator is independent of any temperature induced fluctuations in the output of the light source and only are attributable to the attenuation of the scintillator output arising from its lower light producing efficiency, this being the property that is being compensated for by adjusting the gain of the system.

The gain of the system 20 may be adjusted in any suitable manner. In the illustrated system, for example, the gain of the photomultiplier tube 32 is adjusted as a function of the measured fluorescence pulse produced by the light source. A suitable gain mapping function or algorithm, for example, a proportional-integral-differential (PID) control function, may be used for this purpose to keep, for example, the centroid of the pulse peak in the same neighborhood (at the same channel) over the operating temperature range. That is, gain is adjusted to keep the pulser peak at a constant centroid location. Such techniques are well known in prior art detectors using a radioactive pulser, or a gamma ray source Cs-137 662 keV pulser. Although the PMT gain may be adjusted to maintain the fluorescence peak in a prescribed channel, other ways may be used to adjust system gain. For example, the gain of one or both of the amplifiers 44 and 46 may be adjusted, or the count rate may be adjusted by a correction factor which is a function of the measured attenuation of the pulse output of the light source 60.

In general, for a given system, a gain function ($G_f$) may be empirically or otherwise determined. The gain function provides the relationship between the intensity of scintillated light and the intensity of the fluoresced light, $$I_s(T) = G_f(I_f(T))$$

The intensity of scintillated light $I_S$ will be a function of the intensity of the measured fluorescent light $I_f$ which varies as a function of temperature. The gain function is used to adjust the system gain, the output representative of the measured scintillation light, arising from temperature change.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A radiation detection system comprising:
   a scintillator for emitting flashes of light in response to radiation impinging upon the scintillator;
   a light sensing device positioned proximate the scintillator to receive the flashes of light, the light sensing device producing an electrical output having a magnitude correlated to the light produced by the crystal;
   a light source for emitting photons into the scintillator that are not detectable by the light sensing device but which cause the scintillator to fluoresce at a wavelength detectable by the light sensing device; and
   a processor that monitors the scintillator output attributable to the photon emitting light source and effects adjustment of the gain of the system in response to changes in the scintillator output attributable to the photon emitting light source.

2. A radiation detection system as set forth in claim 1, wherein the light source is pulsed to emit photon pulses.

3. A radiation detection system as set forth in claim 2, wherein the processor is gated such that it measures photon pulses and then adjusts the gain using a control algorithm so the system maintains a constant pulse height vs. energy curve as the temperature of the scintillator changes.

4. The apparatus as set forth in claim 2, wherein the light source emits light pulses of substantially constant intensity independent of temperature change.

5. A radiation detection system as set forth in claim 4, wherein the light source is thermally insensitive to maintain the intensity of the light emitted by the light source regardless of temperature change.

6. A radiation detection system as set forth in claim 2, wherein the light source emits photon pulses above a fluorescence saturation threshold of the scintillator, whereby attenuation of the fluorescent output of the scintillator is essentially independent of temperature change.

7. A radiation detection system as set forth in claim 2, wherein the photons are ultra-violet photons.

8. A radiation detection system as set forth in claim 7, wherein the scintillator includes a scintillation crystal formed from sodium iodide.

9. A radiation detection system as set forth in claim 2, wherein the light sensing device includes a photomultiplier tube and an amplifier for amplifying an output of the photomultiplier tube.

10. A radiation detection system as set forth in claim 9, wherein the scintillator includes a scintillation crystal.

11. A radiation detection system as set forth in claim 10, wherein the scintillation crystal is formed from sodium iodide.

12. A radiation detection system as set forth in claim 1, wherein the photons are ultra-violet photons.

13. A radiation detection system as set forth in claim 12, wherein the scintillator includes a scintillation crystal formed from sodium iodide.

14. A method of stabilizing the output of a radiation detection system which includes a scintillator for emitting flashes of light in response to radiation impinging upon the scintillator and a light sensing device positioned proximate the scintillator to receive the flashes of light, the light sensing device producing an electrical output having a magnitude correlated to the light produced by the scintillator, said method comprising:
    emitting photons into the scintillator that are not detectable by the light sensing device but which cause the scintillator to fluoresce at a wavelength detectable by the light sensing device;
    monitoring the scintillator output attributable to the photon emitting light source; and
    adjusting the gain of the system in response to changes in the scintillator output attributable to the photon emitting light source.

15. A method of stabilizing the output of a radiation detection system as set forth in claim 14, wherein the light source emits photon pulses.

16. A method of stabilizing the output of a radiation detection system as set forth in claim 15, wherein the processor is gated such that it measures photon pulses and then adjusts the gain using a control algorithm so the system maintains a constant pulse height vs. energy curve as the temperature of the scintillator changes.

17. A method of stabilizing the output of a radiation detection system as set forth in claim 15, wherein the light source emits light pulses of substantially constant intensity independent of temperature change.

18. A method of stabilizing the output of a radiation detection system as set forth in claim 15, wherein the light source emits photon pulses above a fluorescence saturation threshold of the scintillator, whereby attenuation of the fluorescent output of the scintillator is essentially independent of temperature change.

19. A method of stabilizing the output of a radiation detection system as set forth in claim 15, wherein the photons are ultra-violet photons.

20. A method of stabilizing the output of a radiation detection system as set forth in claim 19, wherein the scintillator includes a scintillation crystal formed from sodium iodide.

21. A method of stabilizing the output of a radiation detection system as set forth in claim 20, wherein the light sensing device includes a photomultiplier tube and an amplifier for amplifying an output of the photomultiplier tube.

22. A radiation detection system as set forth in claim 14, wherein the scintillator includes a scintillation crystal.

23. A method of stabilizing the output of a radiation detection system as set forth in claim 22, wherein the scintillation crystal is formed from sodium iodide.

24. A method of stabilizing the output of a radiation detection system as set forth in claim 14, wherein the photons are ultra-violet photons.

25. A method of stabilizing the output of a radiation detection system as set forth in claim 24, wherein the scintillator includes a scintillation crystal formed from sodium iodide.

* * * * *